United States Patent
Hirukawa et al.

(10) Patent No.: US 9,169,877 B2
(45) Date of Patent: *Oct. 27, 2015

(54) FIXED CONSTANT VELOCITY UNIVERSAL JOINT

(75) Inventors: Hiroyasu Hirukawa, Iwata (JP); Kenta Yamazaki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/116,191

(22) PCT Filed: May 7, 2012

(86) PCT No.: PCT/JP2012/061635
§ 371 (c)(1),
(2), (4) Date: Nov. 7, 2013

(87) PCT Pub. No.: WO2012/169299
PCT Pub. Date: Dec. 13, 2012

(65) Prior Publication Data
US 2014/0080613 A1    Mar. 20, 2014

(30) Foreign Application Priority Data

Jun. 7, 2011   (JP) .................. 2011-127141
Nov. 1, 2011   (JP) .................. 2011-240395

(51) Int. Cl.
*F16D 3/224*   (2011.01)
*F16D 3/24*    (2006.01)
(Continued)

(52) U.S. Cl.
CPC ............... *F16D 3/24* (2013.01); *F16D 3/2233* (2013.01); *F16D 3/2237* (2013.01)

(58) Field of Classification Search
CPC ....... F16D 3/2233; F16D 3/2237; F16D 3/24; Y10S 464/906
USPC ........................... 464/144–146, 906
See application file for complete search history.

(56) References Cited

U.S. PATENT DOCUMENTS 6,468,164 B2 * 10/2002 Song ............................ 464/144
2010/0016086 A1    1/2010 Sone et al.
(Continued)

FOREIGN PATENT DOCUMENTS

CN    101517255    8/2009
CN    101606001    12/2009
(Continued)

OTHER PUBLICATIONS

International Search Report issued Jul. 17, 2012 in International (PCT) Application No. PCT/JP2012/061635.
(Continued)

*Primary Examiner* — Gregory Binda
(74) *Attorney, Agent, or Firm* — Wenderoth, Lind & Ponack, L.L.P.

(57) ABSTRACT

An outer joint member has first and second track groove portions located respectively on depth and opening sides. The first track groove portions each have a circular-arc ball-raceway center line having a curvature center that is not offset in an axial direction with respect to a joint center. The second track groove portions each have a ball-raceway center line including a straight part to increase an effective track length at a maximum operating angle. Track grooves of an inner joint member each have a ball-raceway center line that is mirror-image symmetrical with a ball-raceway center line of the paired track groove of the outer joint member with respect to a plane passing through the joint center at an operating angle of 0°.

10 Claims, 14 Drawing Sheets

(51) Int. Cl.
*F16D 3/2233* (2011.01)
*F16D 3/2237* (2011.01)

(56) References Cited

U.S. PATENT DOCUMENTS

| | | | |
|---|---|---|---|
| 2010/0216557 A1* | 8/2010 | Nakagawa et al. | |
| 2011/0256939 A1 | 10/2011 | Schwarzler et al. | |
| 2014/0073441 A1* | 3/2014 | Yamazaki et al. | 464/145 |
| 2014/0243104 A1* | 8/2014 | Yamazaki et al. | 464/145 |

FOREIGN PATENT DOCUMENTS

| | | |
|---|---|---|
| JP | 10-73129 | 3/1998 |
| JP | 2007-503554 | 2/2007 |
| JP | 2007-71340 | 3/2007 |
| JP | 2007-218353 | 8/2007 |
| JP | 2007-270997 | 10/2007 |
| JP | 2008-25641 | 2/2008 |
| JP | 2009-228813 | 10/2009 |
| JP | 2009-250365 | 10/2009 |
| JP | 2010-043667 | 2/2010 |
| JP | 2010-133444 | 6/2010 |
| JP | 2011-080555 | 4/2011 |

OTHER PUBLICATIONS

International Preliminary Report on Patentability and Written Opinion of the International Searching Authority issued Dec. 27, 2013 in International (PCT) Application No. PCT/JP2012/061635.

First Office Action issued Jul. 1, 2015 in corresponding Chinese Application No. 201280027450.9 (with partial English translation).

* cited by examiner

Fig. 2a
Fig. 2b
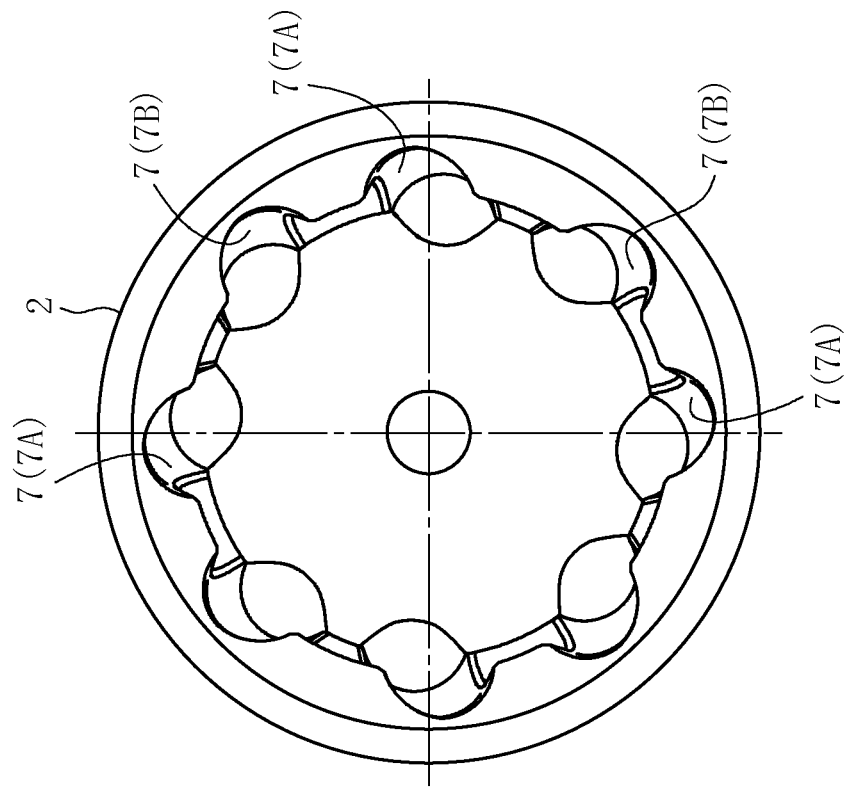
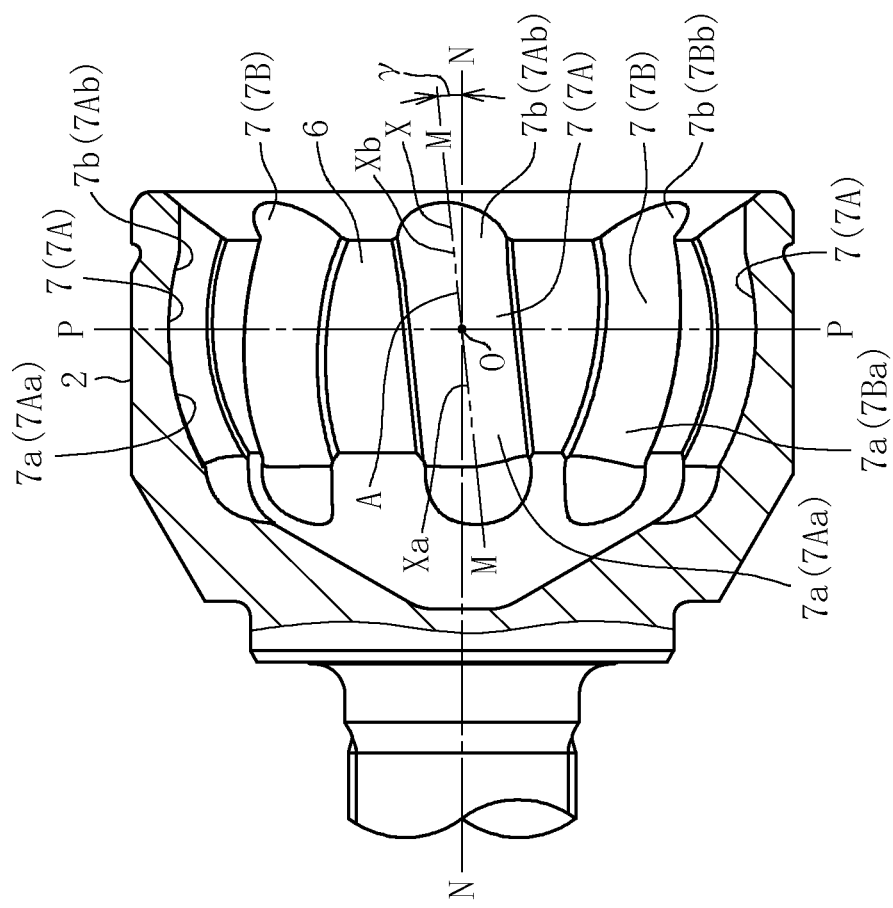

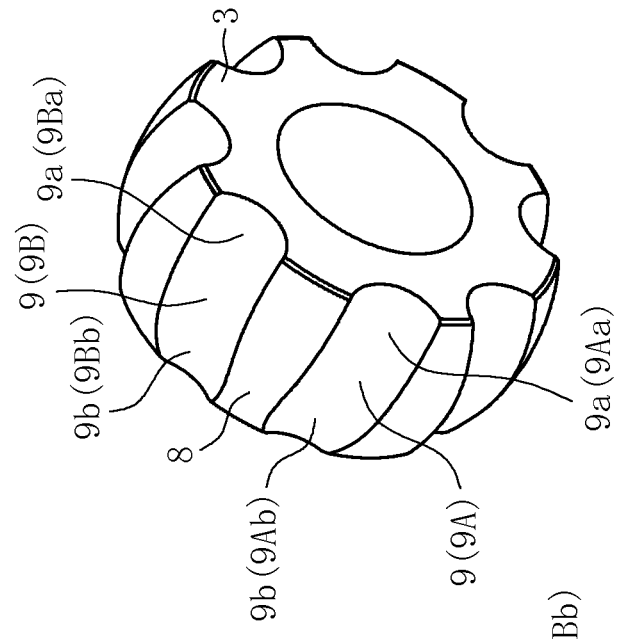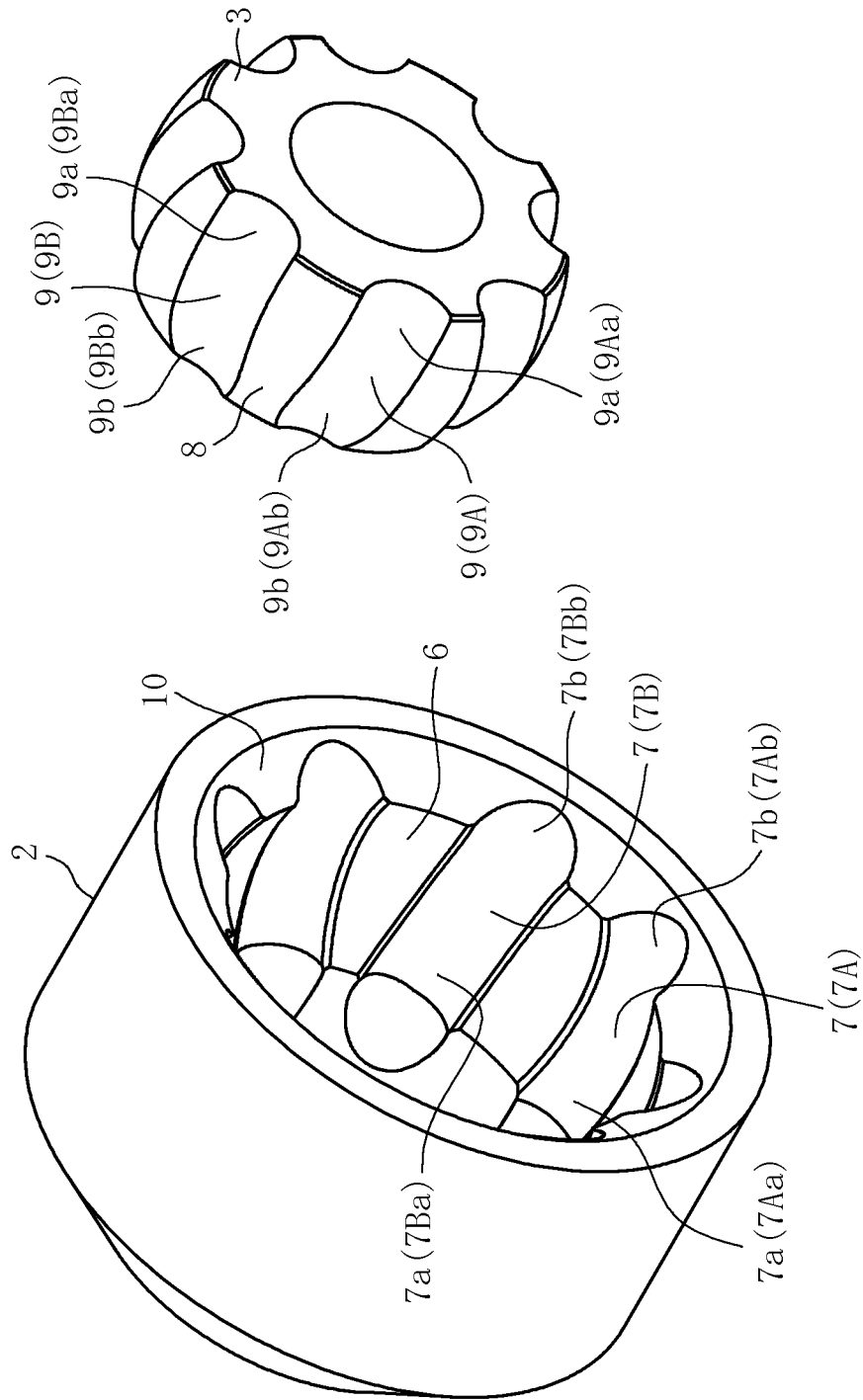

FIXED CONSTANT VELOCITY UNIVERSAL JOINT

BACKGROUND OF THE INVENTION

1. Technical Field

The present invention relates to a fixed type constant velocity universal joint, and more specifically, to a fixed type constant velocity universal joint that is used in a power transmission system for automobiles and various industrial machines and allows only angular displacement between two shafts on a driving side and a driven side.

2. Background Art

For example, a plunging type constant velocity universal joint that is capable of axial displacement while forming an operating angle including a relatively low maximum operating angle is assembled normally on an inboard side (differential side) of a front drive shaft of an automobile. On an outboard side (wheel side), a fixed type constant velocity universal joint that is capable of forming high operating angles but is not displaced in the axial direction is assembled in consideration of steering of the wheel.

FIG. 14 illustrate a Rzeppa type constant velocity universal joint 101 as an example of the fixed type constant velocity universal joint used on the outboard side. FIG. 14a is a vertical sectional view illustrating a state in which an operating angle is set to 0°, and FIG. 14b is a schematic view illustrating a state in which a maximum operating angle is formed. As illustrated in FIG. 14a, the constant velocity universal joint 101 includes, as main components, an outer joint member 102, an inner joint member 103, balls 104, and a cage 105. The outer joint member 102 has a spherical inner peripheral surface 106 including eight track grooves 107 formed equiangularly along an axial direction. The inner joint member 103 has a spherical outer peripheral surface 108 including track grooves 109 formed equiangularly along the axial direction so as to face the track grooves 107 of the outer joint member 102. Eight balls 104 for transmitting torque are interposed between the track grooves 107 of the outer joint member 102 and the track grooves 109 of the inner joint member 103. The cage 105 for holding the balls 104 is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease as a lubricant is sealed inside the joint (none of which is shown).

As illustrated in FIG. 14a, the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball-raceway center line x of the track groove 107 of the outer joint member 102 and a curvature center Oi of a ball-raceway center line y of the track groove 109 of the inner joint member 103 are offset in the axial direction by equal distances with respect to the joint center O. With this, when the joint forms an operating angle, the balls 104 are always guided in a plane obtained by bisection of an angle formed between axial lines of the outer joint member 102 and the inner joint member 103. As a result, rotational torque is transmitted at a constant velocity between the two axes.

As illustrated in FIG. 14b, a maximum operating angle $\theta_{max}$, which may be set as a main function of the fixed type constant velocity universal joint 101, depends on an angle at which an inlet chamfer 110 provided at an opening rim of the outer joint member 102 and a shaft 111 interfere with each other. In order to secure permissible torque to be transmitted, the shaft 111 has an axial diameter d set on a joint-size basis. When a large inlet chamfer 110 is formed, a length of the track groove 107 of the outer joint member 102, on which the ball 104 is brought into abutment (hereinafter referred to as "effective track length"), is insufficient. As a result, the ball 104 drops off the track groove 107, and rotational torque cannot be transmitted. Thus, how the inlet chamfer 110 is formed while securing the effective track length of the outer joint member 102 is an important factor in securing the operating angle. In the Rzeppa type constant velocity universal joint 101, the curvature center Oo of the ball-raceway center line X of the track groove 107 of the outer joint member 102 is offset to an opening side, and hence there is an advantage in terms of the maximum operating angle. However, the maximum operating angle $\theta_{max}$ is approximately 47°.

Further, in comparison with a conventional six-ball constant velocity universal joint, the Rzeppa type constant velocity universal joint 101 of an eight-ball type has a smaller track offset amount, a larger number of balls, and a smaller diameter. Thus, it is possible to provide a high-efficient constant velocity universal joint that is lightweight and compact, and suppresses torque loss. However, at the operating angle of 0°, wedge angles formed between the track grooves 107 and 109 of the outer joint member 102 and the inner joint member 103, which face each other, are opened toward the opening side of the outer joint member 102. Thus, due to forces applied in the axial direction from the track grooves 107 and 109 to the balls, loads to be applied to the spherical contact portions 106 and 112 of the outer joint member 102 and the cage 105 and the spherical contact portions 108 and 113 of the inner joint member 103 and the cage 105 are generated in a certain direction. Thus, this configuration leads to restriction on a further increase in efficiency and suppression of heat generation.

In order to achieve much higher efficiency and less heat generation than those can be achieved by the Rzeppa type constant velocity universal joint 101 of the eight-ball type described above, there has been proposed a fixed type constant velocity universal joint of a track groove crossing type (Patent Document 1). This constant velocity universal joint is illustrated in FIG. 15. FIG. 15a is a vertical sectional view illustrating a state in which the operating angle is set to 0°, and FIG. 15b is a schematic view illustrating a state in which a high operating angle is formed. As illustrated in FIG. 15a, a constant velocity universal joint 121 includes, as main components, an outer joint member 122, an inner joint member 123, balls 124, and a cage 125. The constant velocity universal joint 121 is a constant velocity universal joint of the track groove crossing type. Although not shown, planes each including the ball-raceway center line x of corresponding one of eight track grooves 127 of the outer joint member 122 are inclined with respect to a joint axial line n-n, and inclination directions of the planes defined in the track grooves 127 that are adjacent to each other in the circumferential direction are set opposite to each other. Further, track grooves 129 of the inner joint member 123 each have the ball-raceway center line y formed to be mirror-image symmetrical with the ball-raceway center line x of corresponding one of the paired track grooves 127 of the outer joint member 122 with respect to a plane P including the joint center O at the operating angle of 0°.

In the vertical cross-section illustrated in FIG. 15a, the track grooves 127 formed in a spherical inner peripheral surface 126 of the outer joint member 122 each extend in a circular-arc shape along the axial direction, and have a curvature center located at the joint center O. In a spherical outer peripheral surface 128 of the inner joint member 123, the track grooves 129 that face the track grooves 127 of the outer joint member 122 each extend in a circular-arc shape along the axial direction, and have a curvature center located at the joint center O. Eight balls 124 for transmitting torque are interposed in intersecting portions between the track grooves 127 of the outer joint member 122 and the track grooves 129 of the inner joint member 123. The cage 125 for holding the balls 124 is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, the curvature center of each of the ball-raceway center lines x and y of the respective track grooves 127 and 129 of the outer joint member 122 and the inner joint member 123 is not offset in the axial direction with respect to the joint center O. However, the track grooves 127 and 129 that are inclined and face each other intersect with each other, and the balls 124 are interposed in those intersecting portions. With this, when the joint forms an operating angle, the balls 124 are always guided in a plane obtained by bisection of an angle formed between axial lines of the outer joint member 122 and the inner joint member 123. As a result, rotational torque is transmitted at a constant velocity between the two axes.

In the fixed type constant velocity universal joint 121 of the track groove crossing type described above, the track grooves 127 and 129 of the outer joint member 122 and the inner joint member 123 that are adjacent to each other in the circumferential direction are inclined in the directions opposite to each other. Thus, forces in the opposite directions are applied from the balls 124 to pocket portions 125a adjacent to each other in the circumferential direction of the cage 125. Due to the forces in the opposite directions, the cage 125 is stabilized at a position of the joint center O. Therefore, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Thus, the joint is smoothly operated under high load and in high speed rotation, and torque loss and heat generation are suppressed. As a result, higher durability can be achieved.

The fixed type constant velocity universal joint 121 described above is excellent as a joint that suppresses heat generation. However, there is a problem as follows. As illustrated in FIG. 15b, when a large inlet chamfer 130 is formed in the outer joint member 122 in a structure in which the curvature center of the track groove 127 matches with the joint center O, the effective track length of the track groove 127 of the outer joint member 122 is insufficient. Thus, when a high operating angle θ is formed, the ball 124 drops off the track groove 127, with the result that higher operating angles may not be formed.

PRIOR ART DOCUMENTS

Patent Documents

Patent Document 1: JP 2009-250365 A

Problems to be Solved by the Invention

In view of the above-mentioned problem with the conventional technology, the inventors of the present invention have studied a configuration in which, in each of the track grooves, a part on the opening side with respect to the joint center O is formed into a straight shape so that a higher operating angle can be formed in the fixed type constant velocity universal joint of the track groove crossing type disclosed in Patent Document 1. This constant velocity universal joint is illustrated in FIG. 12. FIG. 12a is a vertical sectional view, and FIG. 12b is a right side view of FIG. 12a. As illustrated in FIG. 12a, this constant velocity universal joint 141 includes an outer joint member 142 and an inner joint member 143 respectively including track grooves 147 and 149 of a crossing type. The track grooves 147 of the outer joint member 142 each include a track groove 147a corresponding to the depth side with respect to the joint center O and having a circular-arc ball-raceway center line xa about the joint center O as a curvature center, and a track groove 147b corresponding to the opening side with respect to the joint center O and having a straight ball-raceway center line xb. On the other hand, the track grooves 149 of the inner joint member 143 each include a track groove 149b corresponding to the depth side with respect to the joint center O and having a straight ball-raceway center line yb, and a track groove 149a corresponding to the opening side with respect to the joint center O and having a circular-arc ball-raceway center line ya about the joint center O as a curvature center.

Further, as illustrated in FIG. 12b, the track grooves 147 and 149 respectively include track grooves 147A and 147B and track grooves 149A and 149B that are inclined in the circumferential direction with respect to the joint axial line and respectively adjacent to each other in the circumferential direction with their inclination directions opposite to each other. In addition, balls 144 are arranged in intersecting portions of pairs of the track grooves 147A and 149A and pairs of the track grooves 147B and 149B of the outer joint member 142 and the inner joint member 143. Thus, at the operating angle of 0° as in the example of the figure, at the time of torque transmission, a wedge angle formed between the track grooves 147A and 149A and a wedge angle formed between the track grooves 147B and 149B are opened in directions opposite to each other. Thus, forces in the opposite directions are applied from the balls 144 to pocket portions 145a adjacent to each other in the circumferential direction of a cage 145. Due to the forces in the opposite directions, the cage 145 is stabilized at the position of the joint center O. Therefore, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Thus, the joint is smoothly operated under high load and in high speed rotation, and torque loss and heat generation are suppressed. As a result, higher durability can be achieved.

As described above, in the track groove crossing type, when the straight track groove 147b is formed on the opening side with respect to the joint center O in each of the track grooves 147 of the outer joint member 142, the effective track length can be increased. However, it has been found that there is a problem in terms of suppression of torque loss and heat generation of the joint at the time of forming frequently used operating angles. Description is made of a cause of the problem with reference to FIG. 13. The track grooves 147 and 149, and the balls 144 are normally held in contact with each other at a contact angle (approximately from 30° to 45°). Thus, as illustrated in FIG. 13, the track grooves 147 and 149, and the balls 144 are held in contact with each other at positions indicated by broken lines on side surface sides of the track grooves 147 and 149, which are slightly spaced apart from groove bottoms of the track grooves 147 and 149. When the joint forms an operating angle, both wedge angle components (not shown) due to intersection between the track grooves 147 and 149 and wedge angle components a due to expansion between the groove bottoms of the track grooves 147 and 149 in a radial direction of the joint are applied to the balls 144. Of those, forces of the wedge angle components due to the intersection between the track grooves 147 and 149 are counterbalanced with each other. This is because the track grooves 147 and 149 are inclined alternately in the directions opposite to each other, and hence the forces in the opposite directions are applied from the balls 144 to the pocket portions 145a of the cage 145.

However, as illustrated in FIG. 13, for the wedge angle components a due to the expansion between the groove bottoms of the track grooves 147 and 149 in the radial direction of the joint, balls 144 within phase ranges of from 0° to 90° and 270° to 360° in FIG. 12b are located in the straight track grooves 147b and 149b. Due to a wedge angle component α1 opened to the opening side, a force toward the opening side is applied to each of the balls 144 within those phase ranges. On the other hand, balls 144 within a phase range of from 90° to 270° are located in the circular-arc track grooves 147a and 149a. Thus, a wedge angle component α2, which is generated due to the expansion in the radial direction of the joint, is zero in any of the balls within this phase range, and hence a push-out force is not generated in the balls 144. Therefore, when the wedge angle components due to the intersection between the track grooves 147 and 149 and the wedge angle components a due to the expansion between the groove bottoms of the track grooves 147 and 149 in the radial direction of the joint are applied simultaneously with each other with respect to the balls 144, the forces applied from the balls 144 to the pocket portions 145a of the cage 145 cannot be balanced with each other. As a result, there arises a problem in that the contact forces between the spherical contact portions 152 and 146 of the cage 145 and the outer joint member 142, and between the spherical contact portions 153 and 148 of the cage 145 and the inner joint member 143 cannot be suppressed. In particular, it has been found that this problem is serious in terms of suppression of torque loss and heat generation in a range of the frequently used operating angles including a normal angle.

In view of the problem described above, it is an object of the present invention to provide a compact fixed type constant velocity universal joint that suppresses torque loss and heat generation, has high efficiency, and is capable of forming high operating angles and also excellent in strength and durability at the high operating angles.

SUMMARY OF THE INVENTION

Solutions to the Problems

Through various studies for achieving the above-mentioned object, the inventors of the present invention have conceived the following novel idea. In order to suppress torque loss and heat generation and to achieve higher efficiency, track grooves are intersected with each other in a circumferential direction, circular-arc first track groove portions having a curvature center that is not offset in an axial direction with respect to a joint center are provided so as to be adaptable to a range of frequently used operating angles, and second track groove portions each comprising a straight part so as to increase an effective track length with respect to a maximum operating angle are provided so as to be adaptable to a range of less frequently used high operating angles.

As technical means for achieving the above-mentioned object, according to one embodiment of the present invention, there is provided a fixed type constant velocity universal joint, comprising: an outer joint member having: a spherical inner peripheral surface provided with a plurality of track grooves extending in an axial direction; and an opening side and a depth side spaced apart from each other in the axial direction; an inner joint member having a spherical outer peripheral surface provided with a plurality of track grooves that are paired with the plurality of track grooves of the outer joint member; a plurality of balls for transmitting torque, the plurality of balls being interposed between the plurality of track grooves of the outer joint member and the plurality of track grooves of the inner joint member; and a cage for holding the plurality of balls, the cage having a spherical outer peripheral surface and a spherical inner peripheral surface that are fitted respectively to the spherical inner peripheral surface of the outer joint member and the spherical outer peripheral surface of the inner joint member. The plurality of track grooves of the outer joint member comprise: first track groove portions 7a each located on the depth side; and second track groove portions 7b each located on the opening side. The first track groove portions 7a each comprise a circular-arc ball-raceway center line Xa having a curvature center that is prevented from being offset in the axial direction with respect to a joint center O. Planes M defined in the first track groove portions 7a that are adjacent to each other in a circumferential direction, the planes M each comprising at least the circular-arc ball-raceway center line Xa and the joint center O, are inclined with respect to a joint axial line N-N with their inclination directions opposite to each other. The second track groove portions 7b each comprise a ball-raceway center line Xb comprising a straight part so as to increase an effective track length at a maximum operating angle. The circular-arc ball-raceway center line Xa of each of the first track groove portions 7a comprises an end portion A located on the opening side with respect to the joint center O in the axial direction. The ball-raceway center line Xb of each of the second track groove portions 7b is connected to the end portion A. The plurality of track grooves of the inner joint member each comprise a ball-raceway center line Y formed to be mirror-image symmetrical with a ball-raceway center line X of corresponding one of the plurality of paired track grooves of the outer joint member with respect to a plane P comprising the joint center O at an operating angle of 0°. The above-mentioned "joint axial line" herein refers to a longitudinal axial line as a joint rotation center, and corresponds to a joint axial line N-N in embodiments described later. The same applies to a joint axial line described in the claims.

With the structure described above, it is possible to provide a compact fixed type constant velocity universal joint that suppresses torque loss and heat generation, has high efficiency, and is capable of forming high operating angles and also excellent in strength and durability at the high operating angles.

More specifically, an angle β is formed by a straight line L connecting the joint center O and the end portion A on the opening side of the ball-raceway center line Xa of the each of the first track groove portions 7a with respect to the plane P comprising the joint center O at the operating angle of 0°, and the angle β may be appropriately set in accordance with a usage state. When the angle β is set to range from 3° to 10° in consideration of a range of normal operating angles of automotive constant velocity universal joints, the fixed type constant velocity universal joint of the present invention is widely applicable to various vehicle types. Note that, here, the angle β is defined as a minimum angle that is formed by the straight line L and an arbitrary straight line in the plane P. In addition, the same applies to the embodiments and the claims.

The curvature center of the circular-arc ball-raceway center line Xa of the each of the first track groove portions 7a is arranged on the joint axial line N-N. With this, track groove depths can be equalized and processes can be facilitated. Further, the curvature center of the circular-arc ball-raceway center line Xa of the each of the first track groove portions 7a is offset in a radial direction with respect to the joint axial line N-N. With this, the track groove depths can be adjusted on the joint depth side, and hence optimum track groove depths can be secured.

The spherical outer peripheral surface and the spherical inner peripheral surface of the cage each have a curvature center that is offset in the axial direction with respect to the joint center O. With this, the cage can be increased in thickness toward the opening side, and hence the strength of the cage can be secured particularly at high operating angles.

The ball-raceway center line Xb of the each of the second track groove portions 7b comprises a circular-arc part. The circular-arc part is connected to the end portion A of the circular-arc ball-raceway center line Xa of corresponding one of the first track groove portions 7a. Thus, the first track groove portions and the second track groove portions can be connected smoothly to each other, respectively.

Further, the straight part of the ball-raceway center line Xb of the each of the second track groove portions 7b can be formed in parallel to a joint axial line N'-N' projected in corresponding one of the planes M. Thus, processes can be facilitated and, at the same time, the effective track length can be increased and a higher maximum operating angle can be formed.

An interval between the straight part of the ball-raceway center line Xb of the each of the second track groove portions 7b and the joint axial line N'-N' projected in the corresponding one of the planes M can be increased in a radial direction toward the opening side. Thus, processes can be facilitated and, at the same time, the effective track length can further be increased and an even higher maximum operating angle can be formed.

The straight part of the ball-raceway center line Xb of the each of the second track groove portions 7b is formed without being inclined in the circumferential direction with respect to the joint axial line N-N. Thus, the processes can further be facilitated. Further, intervals on a closer side between the second track groove portions 7b adjacent to each other in the circumferential direction are increased, and hence differences in intervals can be reduced in the circumferential direction. As a result, differences in contact area on the opening side between the spherical inner peripheral surfaces of the outer joint member and differences in contact area on the depth side between the spherical outer peripheral surfaces of the inner joint member can be reduced. Thus, spherical contact portions between the cage and each of the outer joint member and the inner joint member can be arranged in a balanced manner.

As a result, the fixed type constant velocity universal joint of the present invention can be more smoothly operated.

When the number of the plurality of balls for transmitting torque is set to eight or ten, it is possible to provide a fixed type constant velocity universal joint, and by extension, to provide an automotive drive shaft that is lightweight and compact, has high efficiency, and is capable of forming high operating angles.

Effects of the Invention

According to one embodiment of the present invention, it is possible to provide the compact fixed type constant velocity universal joint that suppresses torque loss and heat generation, has high efficiency, and is capable of forming high operating angles and also excellent in strength and durability at the high operating angles.

BRIEF DESCRIPTION OF DRAWINGS

FIG. 2a is a partial vertical sectional view of an outer joint member of the fixed type constant velocity universal joint.

FIG. 2b is a side view of the outer joint member of the fixed type constant velocity universal joint.

FIG. 7a is a perspective view of the outer joint member.

FIG. 7b is a perspective view of the inner joint member.

EMBODIMENTS OF THE INVENTION

Description is made of embodiments of the present invention with reference to FIGS. 1 to 11.

Figure 1B:
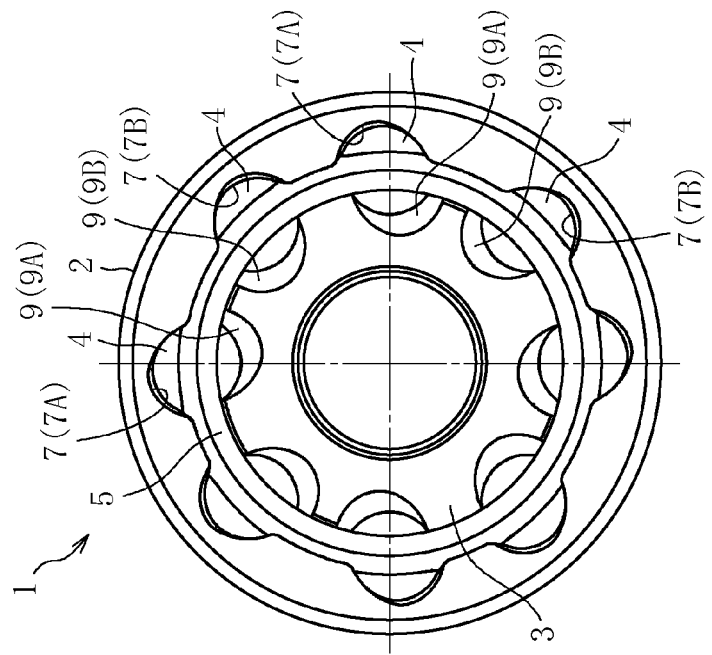
FIG. 1b is a side view of the fixed type constant velocity universal joint according to the first embodiment of the present invention.
Figure 1A:
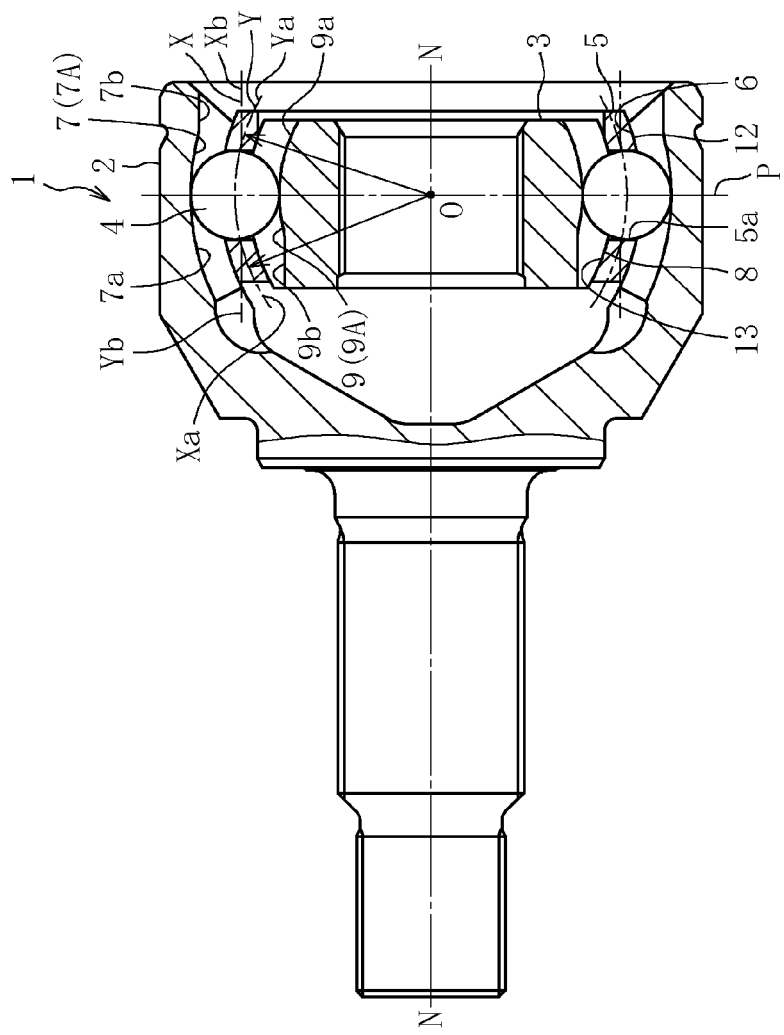
FIG. 1a is a partial vertical sectional view of a fixed type constant velocity universal joint according to a first embodiment of the present invention.
Figure 3A:
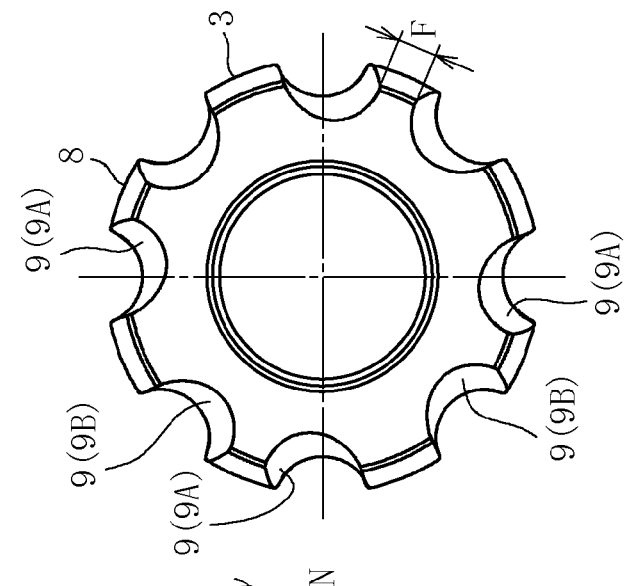
FIG. 3a is a left side view of an inner joint member of the fixed type constant velocity universal joint.
Figure 3B:
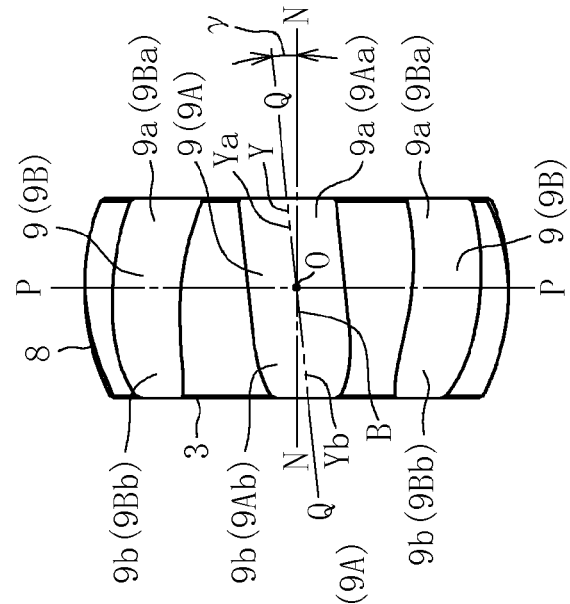
FIG. 3b is a view of an outer peripheral surface of the inner joint member of the fixed type constant velocity universal joint.

FIGS. 1 to 8 illustrate a first embodiment of the present invention. FIG. 1 illustrate a fixed type constant velocity universal joint according to the first embodiment. FIG. 1a is a partial vertical sectional view, and FIG. 1b is a right side view of FIG. 1a. A constant velocity universal joint 1 of this embodiment comprises, as main components, an outer joint member 2, an inner joint member 3, balls 4, and a cage 5. As illustrated in FIG. 1b, FIG. 2, and FIG. 3, eight track grooves 7 and 9 of the outer joint member 2 and the inner joint member 3 respectively comprise track grooves 7A and 7B and track grooves 9A and 9B that are inclined in a circumferential direction with respect to a joint axial line N-N and respectively adjacent to each other in the circumferential direction with their inclination directions opposite to each other. Further, the eight balls 4 are arranged in intersecting portions of pairs of the track grooves 7A and 9A and pairs of track grooves 7B and 9B of the outer joint member 2 and the inner joint member 3. FIG. 1a illustrates the track grooves 7 and 9 under a state in which the cross-sections are rotated to an inclination angle γ=0° in a plane M illustrated in FIG. 2a and a plane Q illustrated in FIG. 3b. The details thereof are described later.

FIG. 1a illustrates the joint in vertical cross-section. The term "ball-raceway center line of each of track grooves" is used herein to accurately describe forms such as an inclined state and a curved state, and shapes of the track grooves extending in an axial direction. Specifically, the ball-raceway center line refers to a trajectory of a center of each of the balls that are arranged in the track grooves and moved along the track grooves. Thus, inclined states of the track grooves correspond to inclined states of the ball-raceway center lines, and circular-arc shapes or straight shapes of the track grooves correspond to circular-arc shapes or straight shapes of the ball-raceway center lines. The track grooves 7 of the outer joint member 2 each have a ball-raceway center line X. The track grooves 7 each comprise a first track groove portion 7a having a circular-arc ball-raceway center line Xa about a joint center O as a curvature center, and a second track groove portion 7b having a straight ball-raceway center line Xb. The ball-raceway center line Xb of the second track groove portion 7b is connected smoothly to the ball-raceway center line Xa of the first track groove portion 7a. On the other hand, the track grooves 9 of the inner joint member 3 each have a ball-raceway center line Y. The track grooves 9 each comprise a first track groove portion 9a having a circular-arc ball-raceway center line Ya about the joint center O as a curvature center, and a second track groove portion 9b having a straight ball-raceway center line Yb. The ball-raceway center line Yb of the second track groove portion 9b is connected smoothly to the ball-raceway center line Ya of the first track groove portion 9a. The curvature centers of the ball-raceway center lines Xa and Ya of the first track groove portions 7a and 9a are arranged on the joint center O, in other words, on the joint axial line N-N. With this, track groove depths can be equalized, and processes can be facilitated. The curvature centers of the ball-raceway center lines Xa and Ya of the first track groove portions 7a and 9a may be offset in a radial direction with respect to the joint axial line. In this case, the track groove depths can be adjusted on a joint depth side, and hence optimum track groove depths can be secured. The track grooves 7 and 9 are each formed into an elliptical shape or a Gothic arch shape in horizontal cross-section, and the track grooves 7 and 9 are held in what is called angular contact with the balls 4 at a contact angle (approximately from 30° to 45°). Thus, the balls 4 are held in contact with side surface sides of the track grooves 7 and 9, which are slightly spaced apart from groove bottoms of the track grooves 7 and 9.

With reference to FIG. 2, detailed description is made of a state in which the track grooves 7 of the outer joint member 2 are inclined in the circumferential direction with respect to the joint axial line N-N. FIG. 2a is a partial vertical sectional view of the outer joint member 2, and FIG. 2b is a right side view of the outer joint member 2. The reference symbols of the track grooves 7A and 7B of the track grooves 7 of the outer joint member 2 are given based on the difference in inclination direction. As illustrated in FIG. 2a, the plane M comprising the ball-raceway center line X of the track groove 7A and the joint center O is inclined at an angle γ with respect to the joint axial line N-N. On the other hand, for the track groove 7B adjacent in the circumferential direction to the track groove 7A, although not shown, another plane M comprising the ball-raceway center line X of the track groove 7B and the joint center O is inclined at the angle γ in a direction opposite to the inclination direction of the track groove 7A with respect to the joint axial line N-N. In this embodiment, the entire ball-raceway center line X of the track groove 7A, in other words, both the ball-raceway center line Xa of the first track groove portion 7a and the ball-raceway center line Xb of the second track groove portion 7b are formed in the plane M. However, the present invention is not limited thereto, and may be carried out in an embodiment in which the plane M comprises only the ball-raceway center line Xa of the first track groove portion 7a. Thus, it suffices that the plane M comprising at least the ball-raceway center line Xa of the first track groove portion 7a and the joint center O be inclined with respect to the joint axial line N-N in the circumferential direction, and that the inclination directions of the first track groove portions 7a adjacent to each other in the circumferential direction be opposite to each other.

Here, supplementary description is made of the reference symbols of the track grooves. Reference symbol 7 represents the track grooves as a whole, reference symbol 7a represents the first track groove portion, and reference symbol 7b represents the second track groove portion. Further, reference symbols 7A and 7B represent the track grooves distinguished from each other based on a difference in inclination direction, reference symbols 7Aa and 7Ba represent first track groove portions of the respective track grooves 7A and 7B, and reference symbols 7Ab and 7Bb represent second track groove portions of the respective track grooves 7A and 7B. The track grooves of the inner joint member 3 described below are similarly represented by the reference symbols.

Figure 3C:
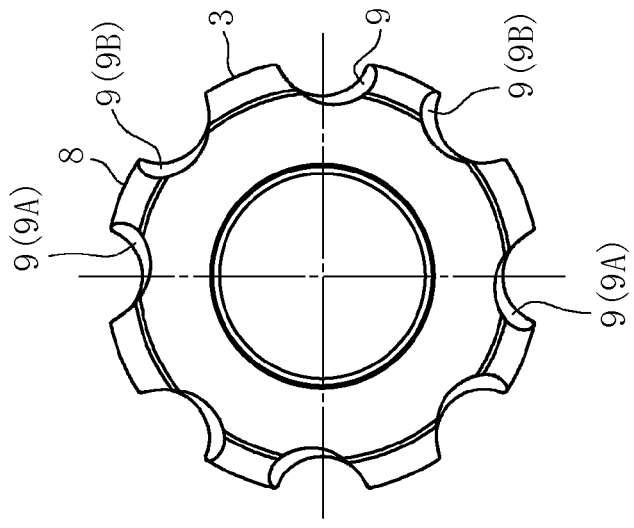
FIG. 3c is a right side view of the inner joint member of the fixed type constant velocity universal joint.

Next, with reference to FIG. 3, detailed description is made of a state in which the track grooves 9 of the inner joint member 3 are inclined in the circumferential direction with respect to the joint axial line N-N. FIG. 3b illustrates an outer peripheral surface of the inner joint member 3, FIG. 3a illustrates a left side surface of the inner joint member 3, and FIG. 3c illustrates a right side surface thereof. The reference symbols of the track grooves 9A and 9B of the track grooves 9 of the inner joint member 3 are given based on the difference in inclination direction. As illustrated in FIG. 3b, the plane Q comprising the ball-raceway center line Y of the track groove 9A and the joint center O is inclined at the angle γ with respect to the joint axial line N-N. On the other hand, for the track groove 9B adjacent in the circumferential direction to the track groove 9A, although not shown, another plane Q comprising the ball-raceway center line Y of the track groove 9B and the joint center O is inclined at the angle γ in a direction opposite to the inclination direction of the track groove 9A with respect to the joint axial line N-N. The inclination angle γ is preferably set to range from 4° to 12° in consideration of operability of the constant velocity universal joint 1 and spherical widths F between closest sides of the track grooves of the inner joint member 3. Similarly to the outer joint member described above, in this embodiment, the entire ball-raceway center line Y of the track groove 9A, in other words, both the ball-raceway center line Ya of the first track groove portion 9a and the ball-raceway center line Yb of the second track groove portion 9b are formed in the plane Q. However, the present invention is not limited thereto, and may be carried out in an embodiment in which the plane Q comprises only the ball-raceway center line Ya of the first track groove portion 9a. Thus, it suffices that the plane Q comprising at least the ball-raceway center line Ya of the first track groove portion 9a and the joint center O be inclined in the circumferential direction with respect to the joint axial line N-N, and that the inclination directions of the first track groove portions 9a adjacent to each other in the circumferential direction be opposite to each other. The ball-raceway center line Y of the track groove 9 of the inner joint member 3 is formed to be mirror-image symmetrical with the ball-raceway center line X of the paired track groove 7 of the outer joint member 2 with respect to a plane P comprising the joint center O and being perpendicular to the joint axial line N-N at an operating angle of 0°.

Figure 4:
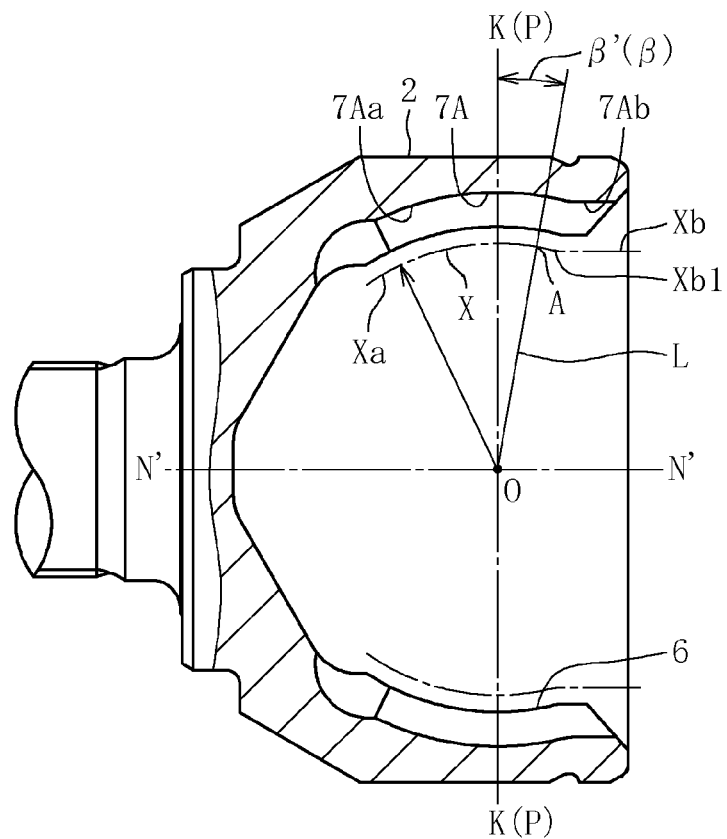
FIG. 4 is a partial vertical sectional view of details of a track groove of the outer joint member.

With reference to FIG. 4, detailed description is made of the track grooves as viewed in vertical cross-section of the outer joint member 2. The partial vertical cross-section of FIG. 4 corresponds to a sectional view as viewed in the plane M of FIG. 2a, which comprises the ball-raceway center line X of the track groove 7A and the joint center O. Thus, strictly, FIG. 4 is not a vertical sectional view in the plane comprising the joint axial line N-N, but illustrates a cross-section inclined at the angle γ. FIG. 4 illustrates the track groove 7A of the outer joint member 2. Description of the track groove 7B is omitted because the track groove 7B is inclined in the direction opposite to that of the track groove 7A, and other structural details thereof are the same as those of the track groove 7A. The outer joint member 2 has a spherical inner peripheral surface 6 comprising the track grooves 7A formed along the axial direction. The track grooves 7A each have the ball-raceway center line X, and the track grooves 7A each comprise the first track groove portion 7Aa having the circular-arc ball-raceway center line Xa about the joint center O as a curvature center (not offset in the axial direction), and the second track groove portion 7Ab having the ball-raceway center line Xb comprising a straight part. In this embodiment, the straight part of the ball-raceway center line Xb of the second track groove portion 7b is formed in parallel to a joint axial line N'-N' projected in the plane M. Thus, the processes can be facilitated and, at the same time, the effective track length can be increased and a higher maximum operating angle can be formed. Further, the ball-raceway center line Xb of the second track groove portion 7Ab is connected smoothly to an end portion A on an opening side of the ball-raceway center line Xa of the first track groove portion 7Aa. In other words, the end portion A is a connecting point between the first track groove portion 7Aa and the second track groove portion 7Ab. Specifically, the ball-raceway center line Xb of the second track groove portion 7Ab comprises a circular-arc ball-raceway center line Xb1 at a part connected to the end portion A, and is connected smoothly to the end portion A through intermediation of this ball-raceway center line Xb1. The joint axial line N'-N' projected in the plane M comprising the ball-raceway center line X of the track groove 7A and the joint center O (refer to FIG. 2a) is inclined at γ with respect to the joint axial line N-N, and an angle formed between a perpendicular line K and a straight line L with respect to the joint center O on the axial line N'-N' is represented by β'. The perpendicular line K is in the plane P comprising the joint center O at the operating angle of 0°. Thus, an angle β formed by the straight line L with respect to the plane P comprising the joint center O at the operating angle of 0° has a relationship of sin β=sin β'×cos γ in the present invention. Alternatively, β corresponds to a projection of β' in a plane corresponding to the plane M inclined at γ with respect to the perpendicular line K and comprising the joint axial line N-N, in other words, in the plane M at the inclination angle γ=0°, and hence may be expressed by tan β=tan β'×cos γ. There is substantially no difference between the former and the latter in terms of a practical numerical range. However, the former is employed here. Although not shown, the straight part of the ball-raceway center line Xb of the second track groove portion 7b of the outer joint member 2 described above may be formed without being inclined in the circumferential direction with respect to the joint axial line N-N. In this case, the processes for the second track groove portion 7b can further be facilitated. Further, intervals on a closer side between the second track groove portions 7b adjacent to each other in the circumferential direction are increased, and hence differences in intervals can be reduced in the circumferential direction. As a result, differences in contact area on the opening side between the spherical inner peripheral surfaces 6 of the outer joint member 2 can be reduced, and hence spherical contact portions between the cage 5 and the outer joint member 2 can be arranged in a balanced manner. Thus, the fixed type constant velocity universal joint can be more smoothly operated. Further, as described above, the first track groove portion 7Aa is formed of a single circular arc. However, the present invention is not limited thereto, and the first track groove portion 7Aa may be formed of a plurality of circular arcs in consideration, for example, of the track groove depths.

Figure 5:
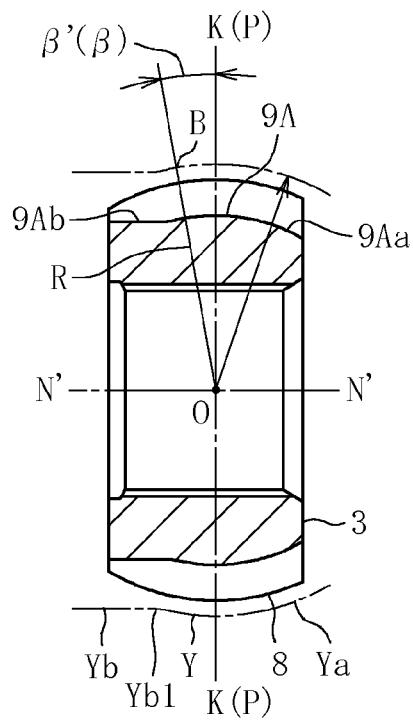
FIG. 5 is a vertical sectional view of details of a track groove of the inner joint member.

Similarly, with reference to FIG. 5, detailed description is made of the track grooves in the vertical cross-section of the inner joint member 3. The vertical cross-section of FIG. 5 corresponds to a sectional view as viewed in the plane Q of FIG. 3b, which comprises the ball-raceway center line Y of the track groove 9A and the joint center O. Thus, similarly to FIG. 4, strictly, FIG. 5 is not a vertical sectional view in the plane comprising the joint axial line N-N, but illustrates a cross-section inclined at the angle γ. FIG. 5 illustrates the track groove 9A of the inner joint member 3. Description of the track groove 9B is omitted because the track groove 9B is inclined in the direction opposite to that of the track groove 9A, and other structural details thereof are the same as those of the track groove 9A. The inner joint member 3 has a spherical outer peripheral surface 8 comprising the track grooves 9A formed along the axial direction. The track grooves 9A each have the ball-raceway center line Y, and the track grooves 9A each comprise a first track groove portion 9Aa having the circular-arc ball-raceway center line Ya about the joint center O as a curvature center (not offset in the axial direction), and a second track groove portion 9Ab having the ball-raceway center line Yb comprising a straight part. Due to the straight part of the ball-raceway center line Yb, the effective track length with respect to the maximum operating angle can be increased. Further, the ball-raceway center line Yb of the second track groove portion 9Ab is connected smoothly to an end portion B on the depth side of the ball-raceway center line Ya of the first track groove portion 9Aa. In other words, the end portion B is a connecting point between the first track groove portion 9Aa and the second track groove portion 9Ab. Specifically, the ball-raceway center line Yb of the second track groove portion 9Ab comprises a circular-arc ball-raceway center line Yb1 at a part connected to the end portion B, and is connected smoothly to the end portion B through intermediation of this ball-raceway center line Yb1. The joint axial line N'-N' projected in the plane Q comprising the ball-raceway center line Y of the track groove 9A and the joint center O (refer to FIG. 3b) is inclined at γ with respect to the joint axial line N-N, and an angle formed between the perpendicular line K and a straight line R with respect to the joint center O on the axial line N'-N' is represented by β'. The perpendicular line K is in the plane P comprising the joint center O at the operating angle of 0°. Thus, the angle β formed by the straight line R with respect to the plane P comprising the joint center O at the operating angle of 0° has the relationship of $\sin \beta = \sin \beta' \times \cos \gamma$. Alternatively, β corresponds to a projection of β' in a plane corresponding to the plane Q inclined at γ with respect to the perpendicular line K and comprising the joint axial line N-N, in other words, in the plane Q at the inclination angle γ=0°, and hence may be expressed by $\tan \beta = \tan \beta' \times \cos \gamma$. There is substantially no difference between the former and the latter in terms of a practical numerical range. However, the former is employed here. Similarly to the track grooves of the outer joint member 2 described above, although not shown, the straight part of the ball-raceway center line Yb of the second track groove portion 9b of the inner joint member 3 described above may be formed without being inclined in the circumferential direction with respect to the joint axial line N-N. Thus, the processes for the second track groove portion 9b can further be facilitated. Further, intervals on a closer side between the second track groove portions 9b adjacent to each other in the circumferential direction are increased, and hence differences in intervals can be reduced in the circumferential direction. As a result, differences in contact area on the depth side between the spherical outer peripheral surfaces 8 of the inner joint member 3 can be reduced, and hence spherical contact portions between the cage 5 and the inner joint member 3 can be arranged in a balanced manner. Thus, the fixed type constant velocity universal joint can be more smoothly operated. Further, the first track groove portion 9Aa of the inner joint member 3 described above may each be formed of a plurality of circular arcs in consideration of track groove depths.

Next, description is made of the angle β formed by each of the straight lines L and R with respect to the plane P comprising the joint center O at the operating angle of 0°. At an operating angle θ, the balls 4 move at θ/2 with respect to the plane P of each of the outer joint member 2 and the inner joint member 3, which comprises the joint center O. The angle β is determined based on ½ of frequently used operating angles.

Then, within a range of the frequently used operating angles, contact ranges of the track grooves with respect to the balls 4 are defined. Here, the frequently used operating angles are defined. First, a normal angle of the joint refers to an operating angle formed in a fixed type constant velocity universal joint of a front drive shaft of an automobile with one person on board when a steering of the automobile is switched to a straightforward mode on a horizontal and flat road surface. Normally, the normal angle is selected and determined within a range of from 2° to 15° in accordance with design conditions for vehicle types. Further, the frequently used operating angle does not refer to a high operating angle formed in the fixed type constant velocity universal joint of the above-mentioned automobile at the time, for example, of right turning and left turning at a traffic intersection but refer to an operating angle formed in the fixed type constant velocity universal joint of the above-mentioned automobile during, for example, continuous travel on a curved road. This is also determined in accordance with the design conditions for vehicle types. The frequently used operating angle is supposed to be 20° at maximum. Thus, the angle β formed by each of the straight lines L and R with respect to the plane P comprising the joint center O at the operating angle of 0° is set to range from 3° to 10°. Note that, the angle β is not limited to the range of from 3° to 10°, and may be appropriately set in accordance with the design conditions for vehicle types. When the angle β is set to range from 3° to 10°, the fixed type constant velocity universal joint of this embodiment is widely applicable to various vehicle types.

In FIG. 4, at the angle β, the end portion A of the ball-raceway center line Xa of the first track groove portion 7Aa corresponds to a center position of a ball that is moved to an end of the opening side along the axial direction at the frequently used operating angle. Similarly, in FIG. 5, in the inner joint member 3, the end portion B of the ball-raceway center line Ya of the first track groove portion 9Aa corresponds to a center position of a ball that is moved to an end of the depth side along the axial direction at the frequently used operating angle. With this setting, within the range of the frequently used operating angles, the balls 4 are located between the first track groove portions 7Aa and 9Aa of the outer joint member 2 and the inner joint member 3, and between the first track groove portions 7Ba and 9Ba that are inclined in the opposite directions (refer to FIG. 2 and FIG. 3). Thus, forces in the opposite directions are applied from the balls 4 to pocket portions 5a adjacent to each other in the circumferential direction of the cage 5, and hence the cage 5 is stabilized at a position of the joint center O (refer to FIG. 1). Therefore, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Thus, the joint is smoothly operated under high load and in high speed rotation, and torque loss and heat generation are suppressed. As a result, higher durability can be achieved.

Figure 6:
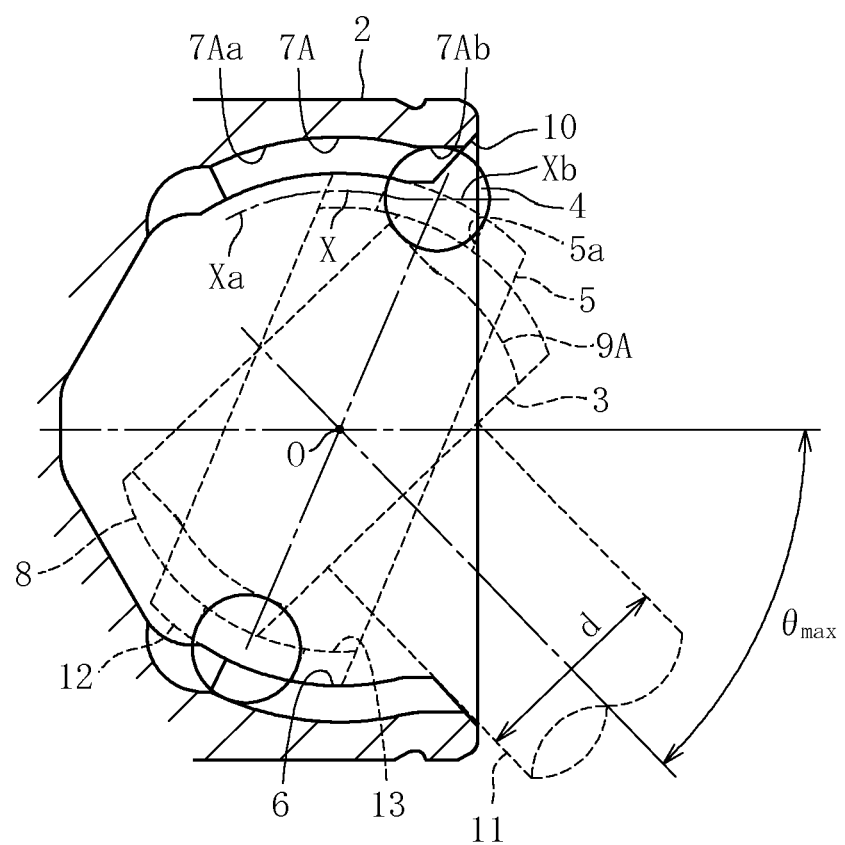
FIG. 6 is a schematic view illustrating a state in which the joint forms a maximum operating angle.

FIG. 6 illustrates a state in which the constant velocity universal joint of this embodiment forms a maximum operating angle. The track grooves 7A of the outer joint member 2 each comprise the second track groove portion 7Ab formed on the opening side and having the ball-raceway center line Xb comprising the straight part. The second track groove portion 7Ab thus formed contributes to an increase in effective track length in a compact design, and hence a higher maximum operating angle can be formed. Thus, as in the example of the figure, even when a maximum operating angle $\theta_{max}$ is formed to be as high as approximately 50°, a contact state between the balls 4 and the second track groove portion 7Ab can be secured under a state in which an inlet chamfer 10 having a necessary and sufficient size is provided.

Note that, in a range of high operating angles, the balls 4 arranged in the circumferential direction are temporarily separately located between the first track groove portions 7Aa and 9Aa (7Ba and 9Ba, refer to FIGS. 2a and 3b) and between the second track groove portions 7Ab and 9Ab (7Bb and 9Bb, refer to FIGS. 2a and 3b). Thus, the forces applied from the balls 4 to the pocket portions 5a of the cage 5 are not balanced with each other, and hence the contact forces are generated respectively in the spherical contact portions 12 and 6 between the cage 5 and the outer joint member 2, and the spherical contact portions 13 and 8 between the cage 5 and the inner joint member 3. However, angles in the range of high operating angles are less frequently used, and hence the constant velocity universal joint 1 of this embodiment is comprehensively capable of suppressing torque loss and heat generation. Thus, it is possible to provide a compact fixed type constant velocity universal joint that suppresses torque loss and heat generation, has high efficiency, and is capable of forming high operating angles and also excellent in strength and durability at the high operating angles.

FIG. 7 are perspective views of the outer joint member 2 and the inner joint member 3 of the constant velocity universal joint of this embodiment. Those perspective views three-dimensionally illustrate the track grooves described hereinabove. As illustrated in FIG. 7a, the spherical inner peripheral surface 6 of the outer joint member 2 comprises the track grooves 7A and 7B that are formed alternately to each other and inclined in the circumferential direction with respect to the joint axial line N-N (not shown) with their inclination directions alternately opposite to each other. The track grooves 7A and 7B comprise the first track groove portions 7Aa and 7Ba and the second track groove portions 7Ab and 7Bb, respectively. The outer joint member 2 has an opening rim provided with the inlet chamfer 10. Further, as illustrated in FIG. 7b, the spherical outer peripheral surface 8 of the inner joint member 3 comprises the track grooves 9A and 9B that are formed alternately to each other and inclined in the circumferential direction with respect to the joint axial line N-N (not shown) with their inclination directions alternately opposite to each other. The track grooves 9A and 9B comprise the first track groove portions 9Aa and 9Ba and the second track groove portion 9Ab and 9Bb, respectively.

Figure 8:
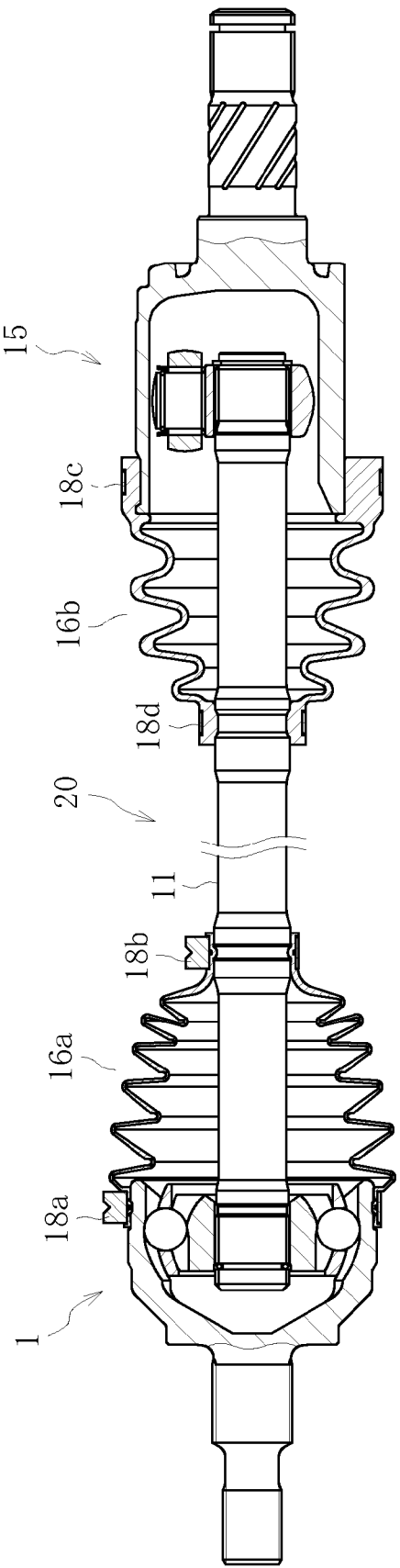
FIG. 8 is a view illustrating a state in which the fixed type constant velocity universal joint is used in an automotive drive shaft.

FIG. 8 illustrates an automotive front drive shaft 20 to which the fixed type constant velocity universal joint 1 of this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are respectively mounted and fixed with boot bands 18a, 18b, 18c, and 18d. Grease as a lubricant is sealed inside the joint. Through use of the fixed type constant velocity universal joint 1 of this embodiment, it is possible to provide a lightweight and compact automotive drive shaft 20 that suppresses torque loss and heat generation, has high efficiency, and forms high operating angles.

Figure 9:
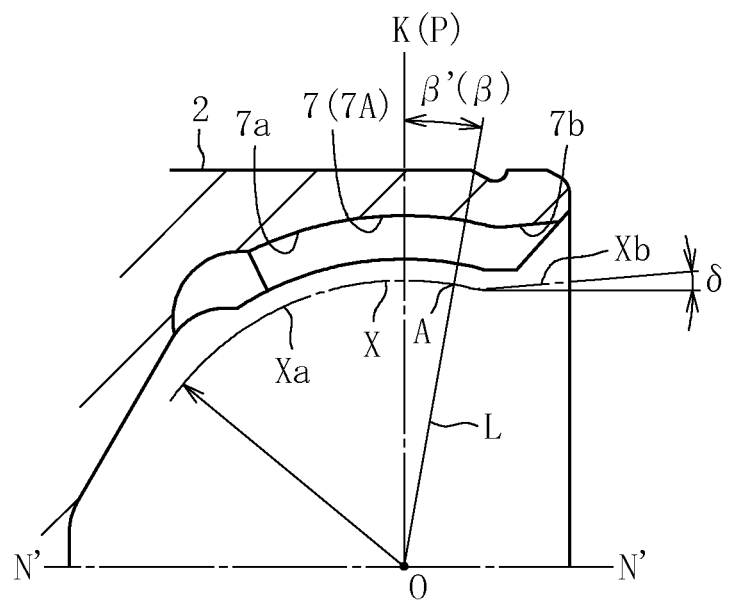
FIG. 9 is a vertical sectional view of an outer joint member of a fixed type constant velocity universal joint according to a second embodiment of the present invention.
Figure 10:
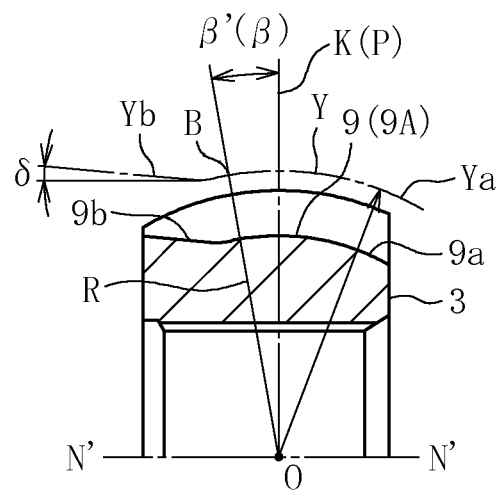
FIG. 10 is a vertical sectional view of an inner joint member of the fixed type constant velocity universal joint according to the second embodiment of the present invention.

Next, description is made of a fixed type constant velocity universal joint according to a second embodiment of the present invention with reference to FIG. 9 and FIG. 10. FIG. 9 illustrates only an outer joint member of the fixed type constant velocity universal joint of this embodiment, and is a sectional view as viewed in the plane M comprising the ball-raceway center line X of the track groove 7A and the joint center O as in FIG. 4 (refer to FIG. 2a). Further, FIG. 9 illustrates an upper half in the radial direction with respect to the axial line of the outer joint member. This fixed type constant velocity universal joint is different from the fixed type constant velocity universal joint of the first embodiment described above in the form of the liner part of the second track groove portions, and other structural details are the same as those in the first embodiment. The parts having the same functions as those in the first embodiment are represented by the same reference symbols, and redundant description thereof is omitted.

The ball-raceway center line Xb of the second track groove portion 7b of the outer joint member 2 has a straight part. This straight part is formed so that an interval between the straight part and the joint axial line N'-N' projected in the plane M comprising the ball-raceway center line X of the track groove 7A and the joint center O is increased in the radial direction toward the opening side. Specifically, the straight part of the ball-raceway center line Xb is formed so as to be inclined at an angle δ with respect to the above-mentioned joint axial line N'-N' in a direction in which the interval is increased toward the opening side. Thus, the processes can be facilitated and, at the same time, the effective track length can further be increased and an even higher maximum operating angle can be formed.

FIG. 10 illustrates an inner joint member, and is a sectional view as viewed in the plane Q comprising the ball-raceway center line Y of the track groove 9A and the joint center O as in FIG. 5 (refer to FIG. 3b). The ball-raceway center line Xb of the second track groove portion 9b of the inner joint member 3 has a straight part. This straight part is formed so that an interval between the straight part and the joint axial line N'-N' projected in the plane M comprising the ball-raceway center line Y of the track groove 9A and the joint center O is increased in the radial direction toward the depth side. Specifically, the straight part of the ball-raceway center line Yb is formed so as to be inclined at an angle δ with respect to the above-mentioned joint axial line N'-N' in a direction in which the interval is increased toward the depth side. The ball-raceway center line Y of the track groove 9 of the inner joint member 3 is formed to be mirror-image symmetrical with the ball-raceway center line X of the paired track groove 7 of the outer joint member 2 with respect to the plane P comprising the joint center O at the operating angle of 0°. The inclined state of the track grooves 7 and 9 of the outer joint member 2 and the inner joint member 3 in the circumferential direction with respect to the joint axial line N-N, the structure of the cage 5, and the functions of the joint are the same as those of the fixed type constant velocity universal joint of the first embodiment. Thus, redundant description thereof is omitted.

Description is made of a fixed type constant velocity universal joint according to a third embodiment of the present invention with reference to FIG. 11. The fixed type constant velocity universal joint of this embodiment is different from the fixed type constant velocity universal joint of the first embodiment in that curvature centers of the spherical outer peripheral surface and the spherical inner peripheral surface of the cage are offset in the axial direction with respect to the joint center O, and other structural details are the same as those in the first embodiment.

Figure 11A:
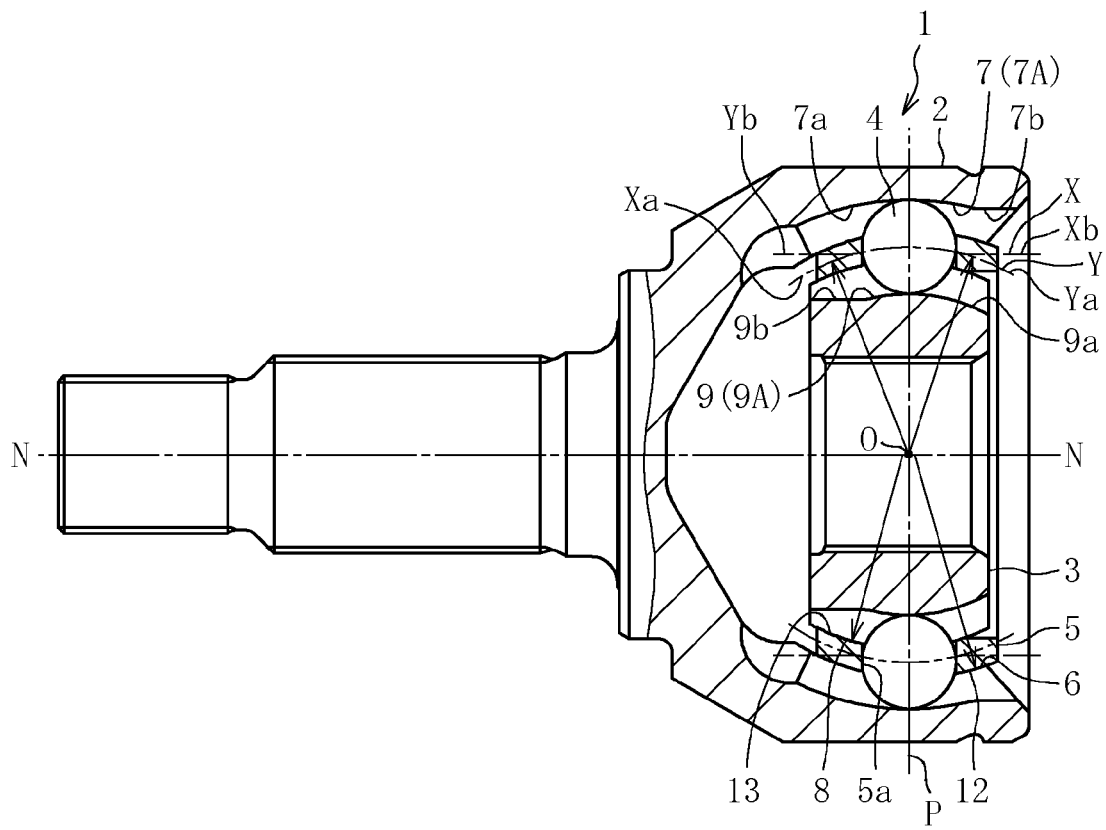
FIG. 11a is a partial vertical sectional view of a fixed type constant velocity universal joint according to a third embodiment of the present invention.
Figure 11B:
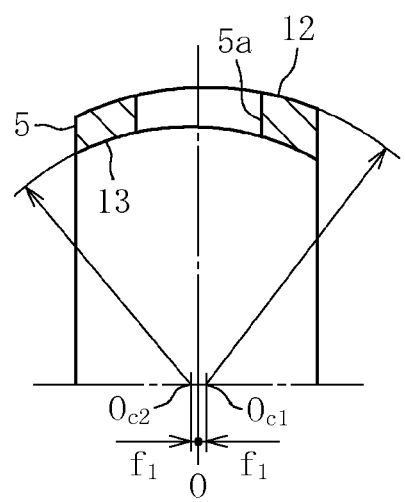
FIG. 11b is a vertical sectional view of a cage of the fixed type constant velocity universal joint.
Figure 12B:
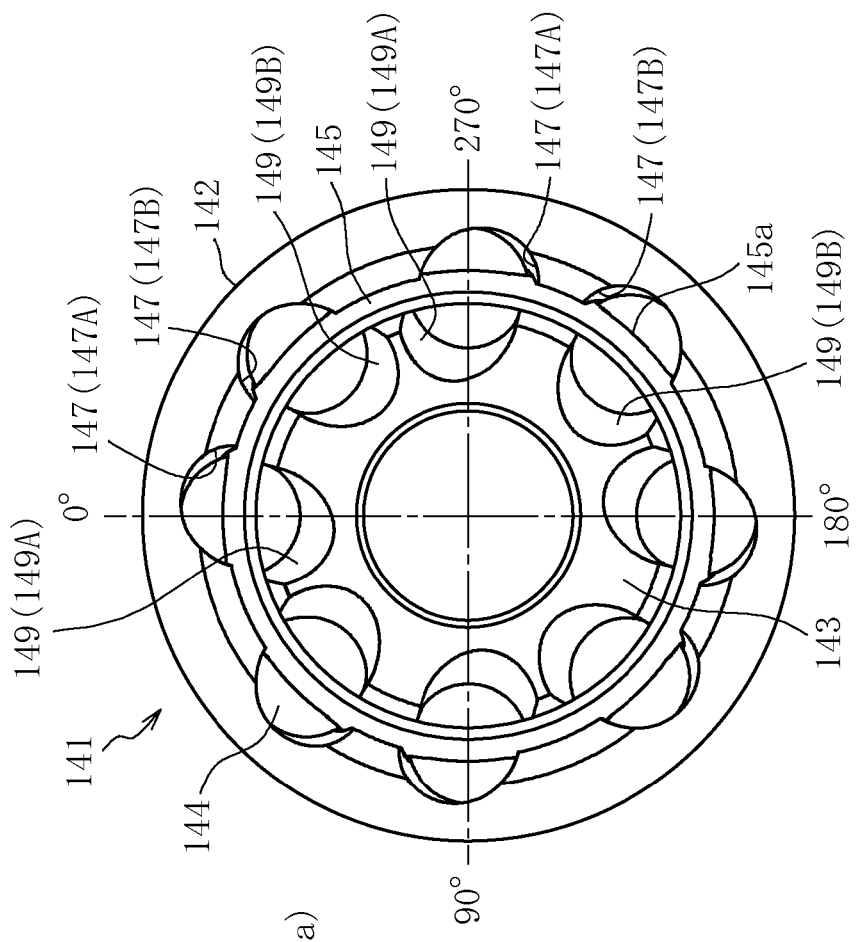
FIG. 12b is a side view of the fixed type constant velocity universal joint, for describing the technical findings in the course of the development of the present invention.
Figure 12A:
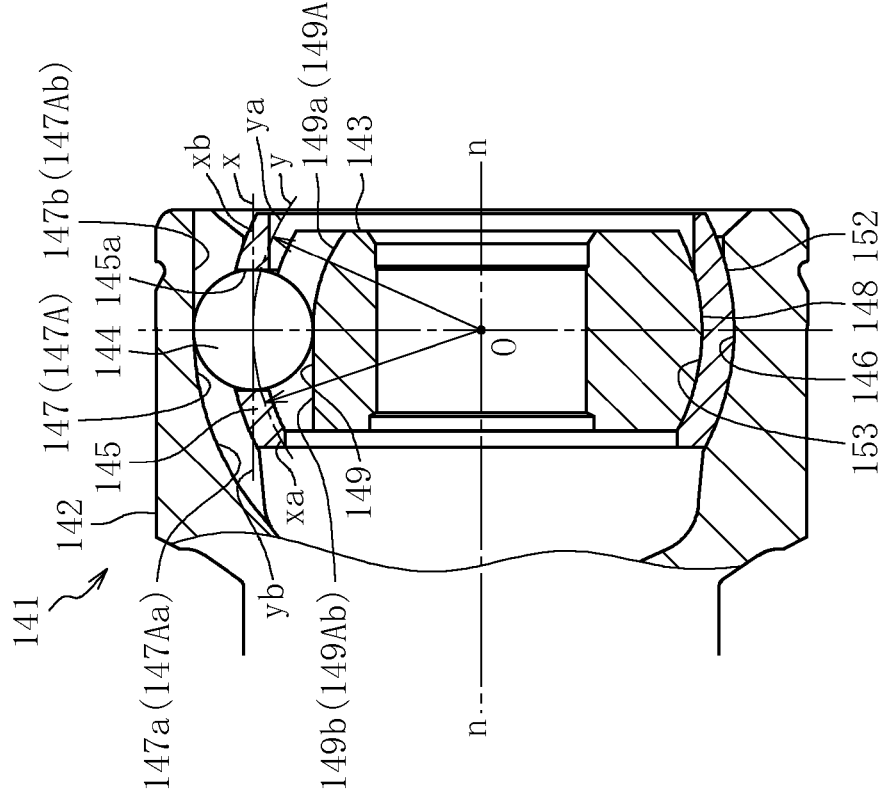
FIG. 12a is a vertical sectional view of a fixed type constant velocity universal joint, for describing technical findings in the course of development of the present invention.
Figure 13:
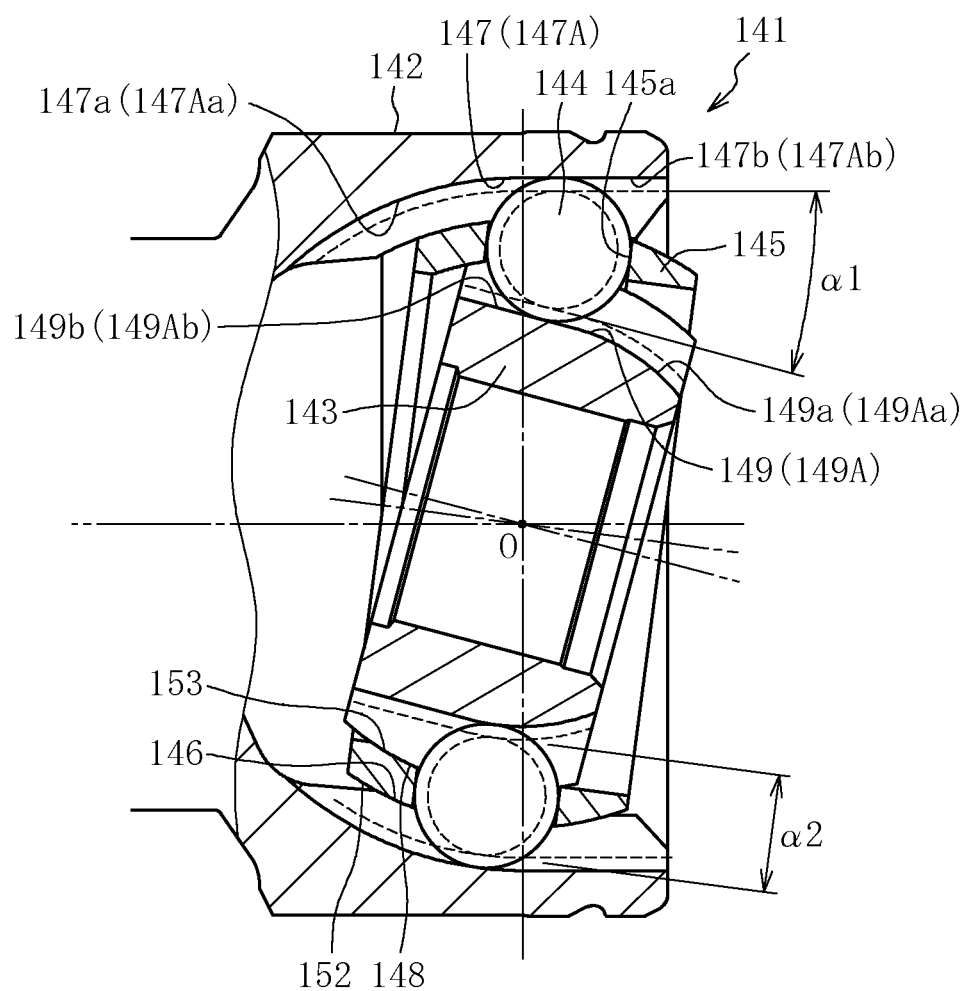
FIG. 13 is a view for describing the technical findings in the course of the development of the present invention.
Figure 14A:
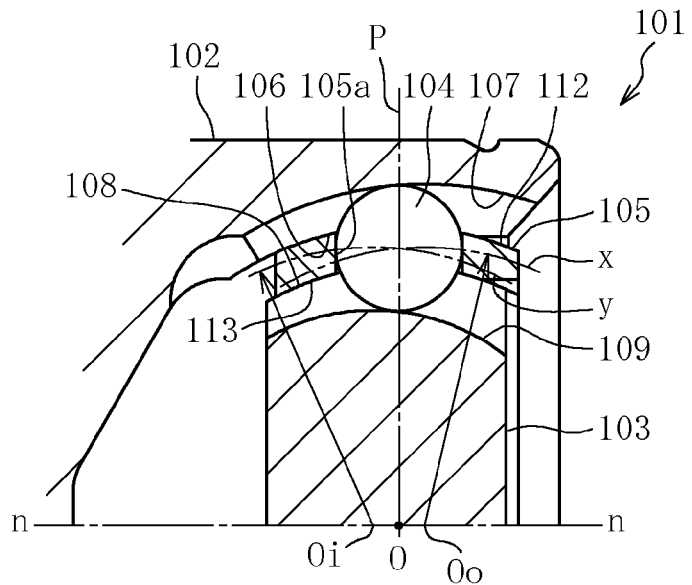
FIG. 14a is a vertical sectional view of a fixed type constant velocity universal joint according to a conventional technology.
Figure 14B:
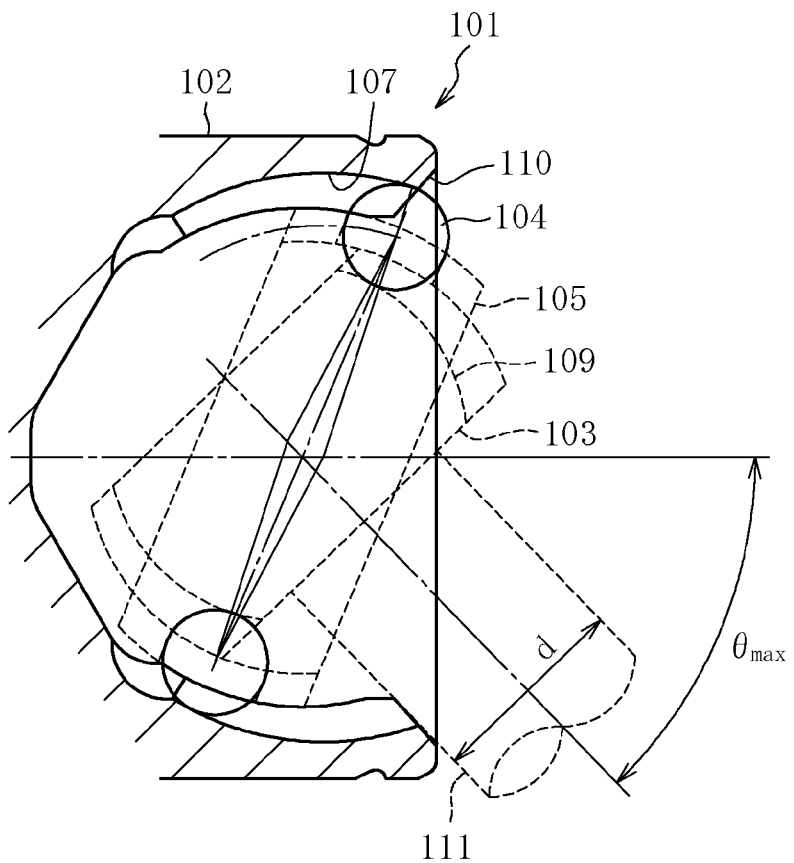
FIG. 14b is a schematic view illustrating a state in which the fixed type constant velocity universal joint according to the conventional technology forms a maximum operating angle.
Figure 15A:
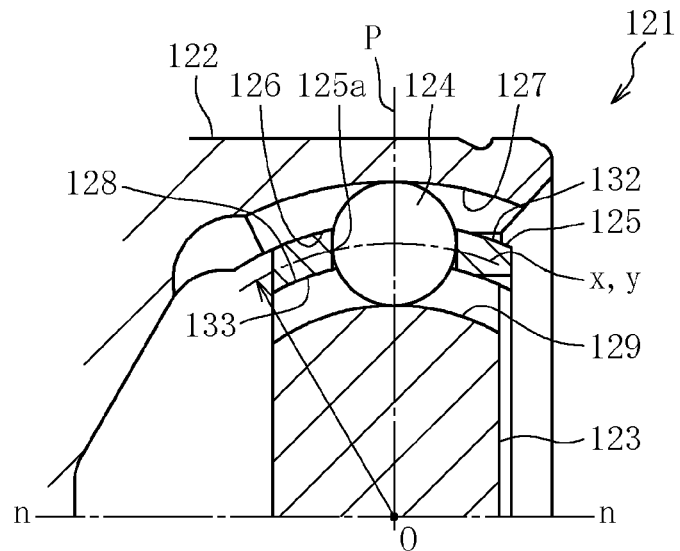
FIG. 15a is a vertical sectional view of a fixed type constant velocity universal joint according to another conventional technology.
Figure 15B:
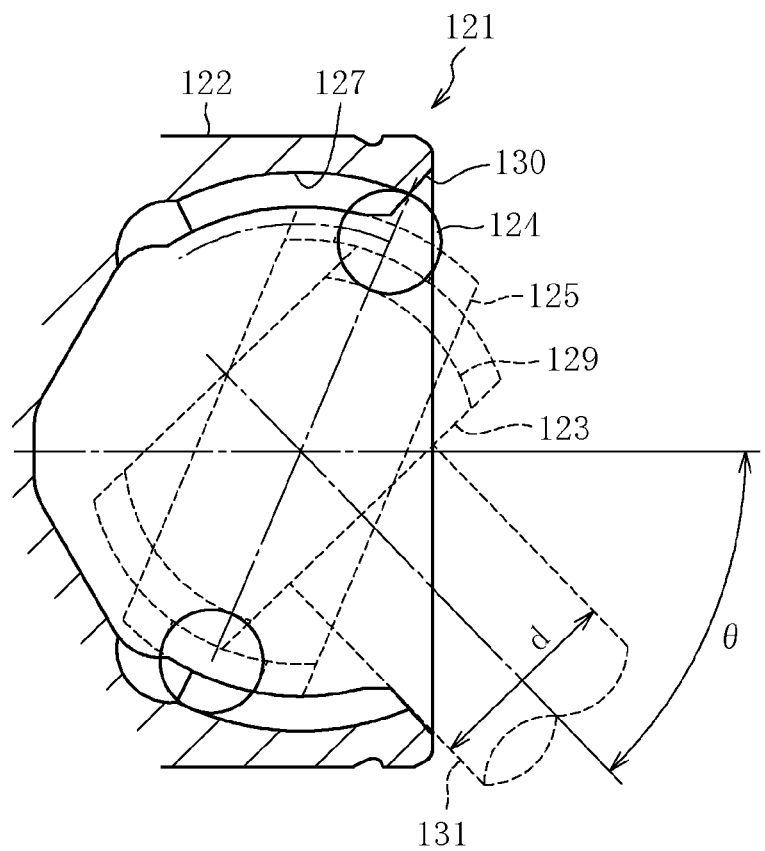
FIG. 15b is a schematic view illustrating a state in which the fixed type constant velocity universal joint according to the another conventional technology forms a high operating angle.

FIG. 11a is a partial vertical sectional view of the fixed type constant velocity universal joint, and FIG. 11b is a vertical sectional view of the cage. FIG. 11a also illustrates the track grooves 7 and 9 under the state in which the cross-sections are rotated to the inclination angle γ=0° in the plane M illustrated in FIG. 2a and the plane Q illustrated in FIG. 3b. A curvature center $O_{c1}$ of the spherical outer peripheral surface 12 of the cage 5 and a curvature center $O_{c2}$ of the spherical inner peripheral surface 13 thereof are each offset by $f_1$ in the axial direction with respect to the joint center O. With this offset configuration, the cage 5 can be increased in thickness toward the opening side, and the cage 5 can be increased in strength particularly at high operating angles. As described above, in the range of the high operating angles, the balls 4 arranged in the circumferential direction are temporarily separately located between the first track groove portions 7Aa and 9Aa (7Ba and 9Ba, refer to FIGS. 2a and 3b) and between the second track groove portions 7Ab and 9Ab (7Bb and 9Bb, refer to FIGS. 2a and 3b). In this case, the pressing forces toward the opening side are applied from the balls 4 located between the second track groove portions 7Ab and 9Ab (7Bb and 9Bb) to the pocket portions 5a of the cage 5. However, the thickness of the cage 5 is increased toward the opening side, and hence the cage 5 can be increased in strength. Further, the track groove depths of the track grooves 7a and 9b on the depth side can be increased. Also in this embodiment, the inclined state of the track grooves 7 and 9 of the outer joint member 2 and the inner joint member 3 in the circumferential direction with respect to the joint axial line N-N, the structure of the cage 5, and the functions of the joint are the same as those of the fixed type constant velocity universal joint of the first embodiment. Thus, redundant description thereof is omitted.

Figure 16:
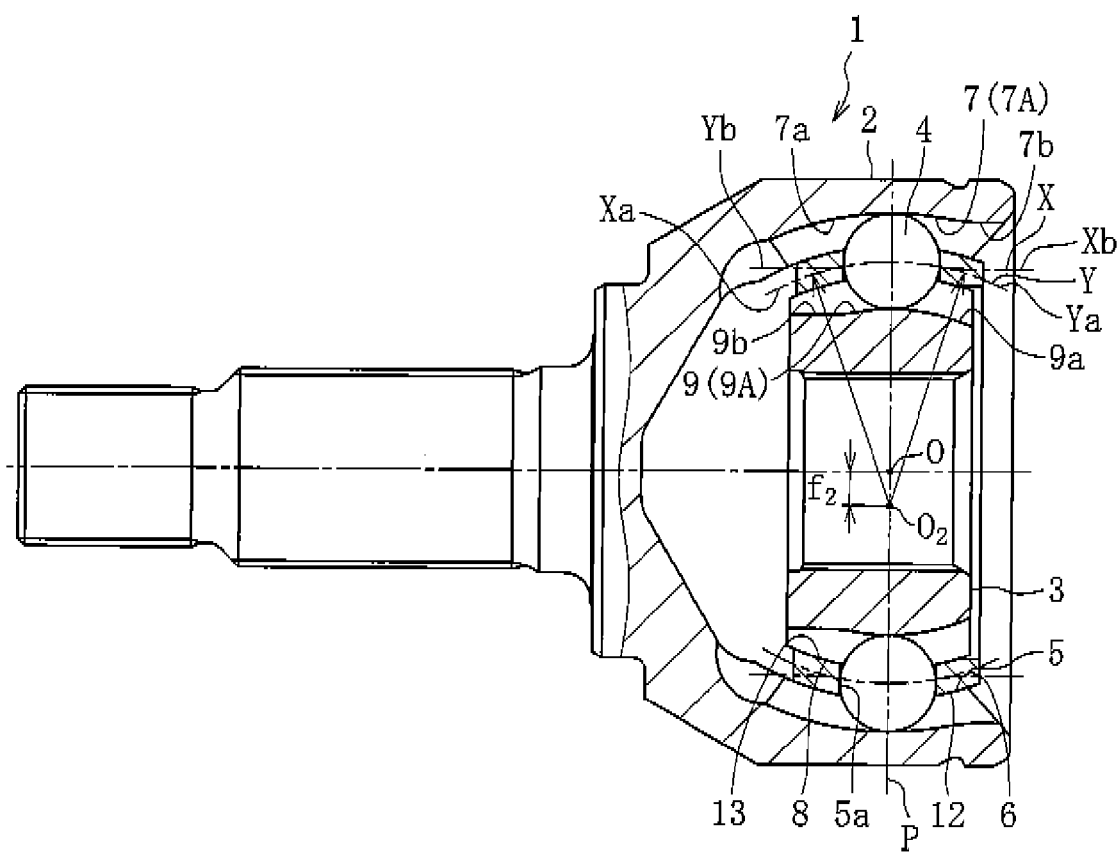
FIG. 16 is a side view of the fixed type constant velocity universal joint.

FIG. 16 is a partial vertical sectional view of the fixed type constant velocity universal joint. FIG. 16 also illustrates the track grooves 7 and 9. The curvature centers $O_2, O_2$ of the ball-raceway center lines Xa and Ya of the first track groove portions 7a and 9a are offset $f_2$ in a radial direction with respect to the joint axial line. In this case, the track groove depths can be adjusted on a joint depth side, and hence optimum track groove depths can be secured.

In the fixed type constant velocity universal joint according to the embodiments described above, the number of the balls 4 is set to eight. However, the present invention is not limited thereto. Ten balls are also preferred, and twelve balls may also be appropriately applicable.

Further, in the fixed type constant velocity universal joint according to the embodiments described above, the ball-raceway center line of the first track groove portion is formed into a single circular arc. However, the present invention is not limited thereto, and the first track groove portion may be formed of a plurality of circular arcs in consideration of the track groove depths. Still further, the above-mentioned track grooves are arranged at a constant pitch in the circumferential direction, but may be arranged at an irregular pitch. Yet further, the above-mentioned inclination angles γ of the first track groove portions with respect to the joint axial line N-N are equal to each other in all the track grooves, but the present invention is not limited thereto. Alternatively, the inclination angle γ of a pair of the first track groove portions of the outer joint member and the inner joint member may be formed to be unequal to the inclination angle γ of another pair of the first track groove portions thereof. That is, it suffices that the inclination angles be set so that the forces of the balls are applied in a balanced manner as a whole in the axial direction to all the pocket portions in the circumferential direction of the cage. In addition, the track grooves and the balls are held in angular contact at a contact angle in the embodiments described above, but the present invention is not limited thereto. The track grooves and the balls may be held in circular contact by forming the track grooves into a circular shape in horizontal cross-section.

The present invention is not limited to the above-mentioned embodiments. As a matter of course, the present invention may be carried out in various modes without departing from the spirit of the present invention. The scope of the present invention is described by claims, and encompasses the meaning equivalent to the description in the claims and all modifications within the scope.

DESCRIPTION OF REFERENCE SIGNS

1 fixed type constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove
9b second track groove
11 shaft
12 spherical outer peripheral surface
13 spherical inner peripheral surface
20 drive shaft
A end portion
B end portion
$f_1$ offset amount
K perpendicular line
L straight line
M plane comprising ball-raceway center line
N joint axial line
O joint center
P joint center plane
Q plane comprising ball-raceway center line
$O_{o1}$ curvature center
$O_{o2}$ curvature center
R straight line
X ball-raceway center line
Y ball-raceway center line
γ inclination angle
β angle
θ operating angle

The invention claimed is:
1. A fixed type constant velocity universal joint, comprising:
   an outer joint member having:
      a spherical inner peripheral surface provided with a plurality of track grooves extending in an axial direction; and
      an opening side and a depth side spaced apart from each other in the axial direction;
   an inner joint member having a spherical outer peripheral surface provided with a plurality of track grooves that are paired with the plurality of track grooves of the outer joint member;
   a plurality of balls for transmitting torque, the plurality of balls being interposed between the plurality of track grooves of the outer joint member and the plurality of track grooves of the inner joint member; and
   a cage for holding the plurality of balls, the cage having a spherical outer peripheral surface and a spherical inner peripheral surface that are fitted respectively to the spherical inner peripheral surface of the outer joint member and the spherical outer peripheral surface of the inner joint member, wherein the plurality of track grooves of the outer joint member comprise:
  first track groove portions each located on the depth side; and
  second track groove portions each located on the opening side, wherein the first track groove portions each comprise a circular-arc ball-raceway center line having a curvature center that is prevented from being offset in the axial direction with respect to a joint center, wherein planes defined in the first track groove portions that are adjacent to each other in a circumferential direction, the planes each comprising at least the circular-arc ball-raceway center line and the joint center, are inclined with respect to a joint axial line with inclination directions opposite to each other, wherein the second track groove portions each comprise a ball-raceway center line comprising a straight part configured to adjoin and thereby extend an effective track length at a maximum operating angle, wherein the circular-arc ball-raceway center line of each of the first track groove portions comprises an end portion located on the opening side with respect to the joint center, wherein the ball-raceway center line of each of the second track groove portions is connected to the end portion, and wherein the plurality of track grooves of the inner joint member each comprise a ball-raceway center line formed to be mirror-image symmetrical with a ball-raceway center line of a corresponding one of the plurality of paired track grooves of the outer joint member with respect to a plane comprising the joint center at an operating angle of 0°.

2. A fixed type constant velocity universal joint according to claim 1, wherein an angle formed by a straight line connecting the joint center and the end portion on the opening side of the circular-arc ball-raceway center line of each of the first track groove portions with respect to the plane comprising the joint center at the operating angle of 0° is within a range from 3° to 10°.

3. A fixed type constant velocity universal joint according to claim 1, wherein the curvature center of the circular-arc ball-raceway center line of each of the first track groove portions is arranged on the joint axial line.

4. A fixed type constant velocity universal joint according to claim 1, wherein the curvature center of the circular-arc ball-raceway center line of each of the first track groove portions is offset in a radial direction with respect to the joint axial line.

5. A fixed type constant velocity universal joint according to claim 1, wherein the spherical outer peripheral surface of the cage and the spherical inner peripheral surface of the cage each have a curvature center that is offset in the axial direction with respect to the joint center.

6. A fixed type constant velocity universal joint according to claim 1,
  wherein the ball-raceway center line of each of the second track groove portions comprises a circular-arc part, and
  wherein the circular-arc part is connected to the end portion of the circular-arc ball-raceway center line of a corresponding one of the first track groove portions.

7. A fixed type constant velocity universal joint according to claim 1, wherein the straight part of the ball-raceway center line of the each of the second track groove portions is parallel to a joint axial line projected in a corresponding one of the planes.

8. A fixed type constant velocity universal joint according to claim 1, wherein the straight part of the ball-raceway center line of each of the second track groove portions is prevented from being inclined in the circumferential direction with respect to the joint axial line.

9. A fixed type constant velocity universal joint according to claim 1, wherein a number of the plurality of balls for transmitting torque is eight.

10. A fixed type constant velocity universal joint according to claim 1, wherein the plurality of track grooves of the outer joint member and the plurality of track grooves of the inner joint member intersect.

* * * * *